No. 621,082. Patented Mar. 14, 1899.
W. HESTON.
VALVE.
(Application filed July 28, 1898.)
(No Model.)
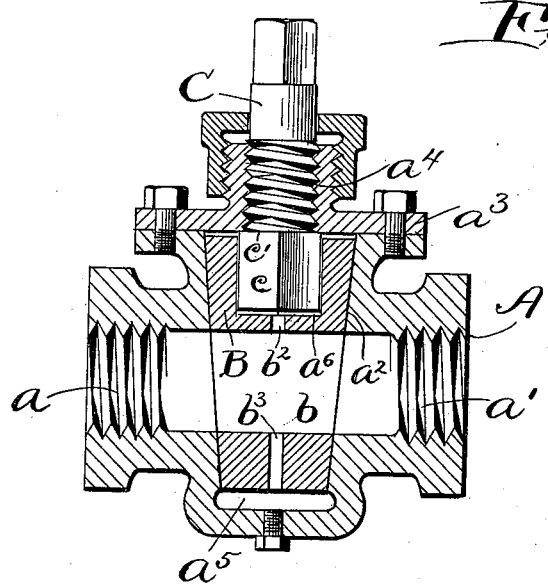
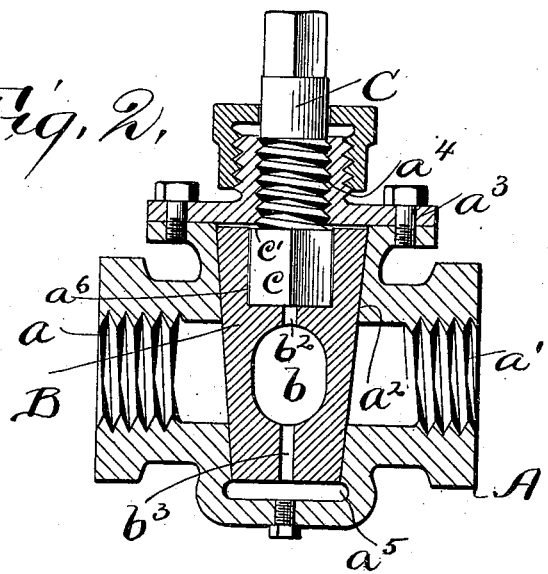
Witnesses:
E. B. Gilchrist
Philip E. Knowlton
Inventor,
William Heston,
By his attorneys,
Thurston & Bates

UNITED STATES PATENT OFFICE.

WILLIAM HESTON, OF HOMESTEAD, PENNSYLVANIA.

VALVE.

SPECIFICATION forming part of Letters Patent No. 621,082, dated March 14, 1899.

Application filed July 28, 1898. Serial No. 687,124. (No model.)

*To all whom it may concern:*

Be it known that I, WILLIAM HESTON, a citizen of the United States, residing at Homestead, in the county of Allegheny and State of Pennsylvania, have invented a certain new and useful Improvement in Valves, of which the following is a full, clear, and exact description, reference being had to the accompanying drawings.

The object of the invention is to provide a new and very cheap valve which will be sealed by the act of closing it, wherefore the closed valve will not leak whatever may be the pressure upon it.

The invention consists in the construction and combination of parts hereinafter described.

In the drawings, Figure 1 is a sectional view of the valve when opened. Fig. 2 is a similar view when the valve is closed.

As shown in the drawings, A represents the casing of a straightway-valve, $a$ $a'$ being respectively the inlet and outlet openings. Between these openings is the tapered seat $a^2$, in which a tapered plug B is fitted in the usual manner, whereby said plug may shut off communication between said two openings, as shown in Fig. 2. The plug has the usual transverse port $b$, which by the turning of the plug may be brought into line with said openings, as shown in Fig. 1. The upper end of the casing is closed by a suitable cap $a^3$, in which and in axial line with the plug is a threaded opening $a^4$. A stem C, which is threaded, (preferably with a left-hand thread,) screws through this opening. The lower end of this stem is so connected with the plug that the turning of the stem causes the plug to turn. As shown, the lower end $c$ of the stem is made angular in cross-section (preferably square) and fits into a socket $a^6$ in the top of the plug. When the plug is in the open position, the lower end of the stem does not strike the bottom of this socket, but is removed from it a distance slightly less than one-quarter of the pitch of the screw on said stem. To close the valve, the stem is turned substantially one-quarter of a revolution, the upper end of said stem being shaped to take a wrench or other form of handle for turning it. In so turning the stem moves down through the cap and its end strikes the bottom of said socket just before it has made a quarter-turn, wherefore during the last part of said quarter-turn the stem not only turns the plug, but it pushes it down tightly into its tapered socket, thereby effectually sealing the plug and making the valve absolutely tight. In case of wear to the end of the stem and bottom of the plug-socket such wear may be compensated for by the introduction of a thin shim or plate in the socket.

The stem below the cap is enlarged, forming a shoulder $c'$, which when the stem has been turned so that the plug is in the open position will strike said cap and prevent the further turning of said stem.

The leakage-chamber $a^5$ is formed below the plug, and preferably the two small ports $b^2$ $b^3$ are formed in the plug from the port $b$ to both ends.

Having described my invention, I claim—

1. The combination of a valve-casing having a tapered plug-seat, a plug fitted in said seat, and a cap for the casing with a threaded stem which screws through said cap in axial line with the plug, and a connection between said plug and stem whereby the turning of the latter turns the former, and the downward movement of said screw through the cap forces the plug down into its seat, substantially as specified.

2. The combination of a valve-casing having a tapered plug-seat, and a plug fitted therein, having an angular socket in its upper end, with a threaded stem which screws through the casing-wall, in axial line with the plug, and has its lower end shaped to fit said socket, the end of the stem, the bottom of the socket, and the pitch of the thread on the stem being relatively proportioned and arranged, substantially as described, whereby the stem will push the plug firmly to its seat when it turns it to the closed position, substantially as specified.

3. The combination of a valve-casing containing a tapered seat, a cap having a screw-threaded opening which is axial with respect to said seat, and a tapered plug having in its upper end an angular socket, with a threaded stem which is screwed through said cap, and has, below the cap, a shoulder for engagement with it, and an angular end which fits the socket in the plug, the inner end of the stem being adapted to strike the bottom of the socket when the stem and plug are turned to the closed position, whereby the valve is effectually sealed, substantially as specified.

In testimony whereof I hereunto affix my signature in the presence of two witnesses.

WILLIAM HESTON.

Witnesses:
E. B. GILCHRIST,
FRANCIS J. WING.